(12) United States Patent
Wang et al.

(10) Patent No.: US 11,249,862 B2
(45) Date of Patent: Feb. 15, 2022

(54) METHOD FOR MANAGING BACKUP SYSTEM, ELECTRONIC DEVICE AND COMPUTER PROGRAM PRODUCT

(71) Applicant: EMC IP Holding Company LLC, Hopkinton, MA (US)

(72) Inventors: Aaron Ren Wang, Shanghai (CN); Weiyang Liu, Shanghai (CN); Ming Zhang, Shanghai (CN); Qi Wang, Shanghai (CN); Jerry Zengjie Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/867,003

(22) Filed: May 5, 2020

(65) Prior Publication Data

US 2021/0182155 A1 Jun. 17, 2021

(30) Foreign Application Priority Data

Dec. 13, 2019 (CN) .......................... 201911282379.9

(51) Int. Cl.
*G06F 11/14* (2006.01)
*G06F 11/34* (2006.01)
*G06K 9/62* (2006.01)
*G06N 7/00* (2006.01)

(52) U.S. Cl.
CPC ...... *G06F 11/1464* (2013.01); *G06F 11/1461* (2013.01); *G06F 11/3476* (2013.01); *G06K 9/6215* (2013.01); *G06N 7/005* (2013.01); *G06F 2201/81* (2013.01)

(58) Field of Classification Search
CPC ............. G06F 11/1464; G06F 11/3476; G06F 11/1461; G06F 2201/81; G06K 9/6215; G06N 7/005
USPC ........................................................ 714/6.3
See application file for complete search history.

(56) References Cited

U.S. PATENT DOCUMENTS 9,804,909 B1 * 10/2017 Fang .................... G06F 11/1451
10,083,094 B1 * 9/2018 Thomas .............. G06F 11/1451

* cited by examiner

*Primary Examiner* — Yair Leibovich
(74) *Attorney, Agent, or Firm* — Womble Bond Dickinson (US) LLP

(57) ABSTRACT

Embodiments of the present disclosure provide a method, electronic device and computer program product for managing a backup system. The method comprises: determining, based on historical backup information of the backup system in a first time period, at least one temporal feature corresponding to the first time period, the historical backup information indicating a set of numbers of backup jobs executed by the backup system in the first time period; determining, based on the at least one temporal feature, a set of predicted numbers of backup jobs expected to be executed by the backup system in a second time period; and determining a health status of the backup system based on the set of predicted numbers and a set of actual numbers of backup jobs executed actually by the backup system in the second time period. In this way, the health status of the backup system can be determined in time.

17 Claims, 4 Drawing Sheets

200

202
DETERMINE, BASED ON HISTORICAL BACKUP INFORMATION OF THE BACKUP SYSTEM IN A FIRST TIME PERIOD, AT LEAST ONE TEMPORAL FEATURE CORRESPONDING TO THE FIRST TIME PERIOD

204
DETERMINE, BASED ON THE AT LEAST ONE TEMPORAL FEATURE, A SET OF PREDICTED NUMBERS OF BACKUP JOBS EXPECTED TO BE EXECUTED BY THE BACKUP SYSTEM IN A SECOND TIME PERIOD

206
DETERMINE A HEALTH STATUS OF THE BACKUP SYSTEM BASED ON THE SET OF PREDICTED NUMBERS AND A SET OF ACTUAL NUMBERS OF BACKUP JOBS EXECUTED ACTUALLY BY THE BACKUP SYSTEM IN THE SECOND TIME PERIOD

METHOD FOR MANAGING BACKUP SYSTEM, ELECTRONIC DEVICE AND COMPUTER PROGRAM PRODUCT

CROSS-REFERENCE TO RELATED APPLICATION

This patent application claims priority, under 35 U.S.C. § 119, of Chinese Patent Application No. 201911282379.9, filed Dec. 13, 2019, which is incorporated by reference in its entirety.

FIELD

Embodiments of the present disclosure generally relate to the field of computer, and more specifically, to a method for managing a backup system, an electronic device and a computer program product.

BACKGROUND

In recent years, with the development of computer technologies, people pay more and more importance to data storage safety. Data backup gradually becomes a common technique for ensuring data safety. Users typically customize their own backup policies to cause the backup system to back up data automatically. Any abnormality of the backup system may bring about impact on the users' backup policies or data safety. Therefore, the users desire to learn about the health status of the backup system in time.

SUMMARY

Embodiments of the present disclosure provide a solution for managing a backup system.

According to a first aspect of the present disclosure, there is provided a method of managing a backup system. The method comprises: determining, based on historical backup information of a backup system in a first time period, at least one temporal feature corresponding to the first time period, the historical backup information indicating a set of numbers of backup jobs executed by the backup system in the first time period; determining, based on the at least one temporal feature, a set of predicted numbers of backup jobs expected to be executed by the backup system in a second time period; and determining, based on the set of predicted numbers and a set of actual numbers of backup jobs executed actually by the backup system in the second time period, a health status of the backup system.

According to a second aspect of the present disclosure, there is provided an electronic device. The device comprises: at least one processing unit; and at least one memory coupled to the at least one processing unit and storing instructions executable by the at least one processing unit, the instructions, when executed by the at least one processing unit, causing the device to perform acts comprising: determining, based on historical backup information of a backup system in a first time period, at least one temporal feature corresponding to the first time period, the historical backup information indicating a set of numbers of backup jobs executed by the backup system in the first time period; determining, based on the at least one temporal feature, a set of predicted numbers of backup jobs expected to be executed by the backup system in a second time period; and determining, based on the set of predicted numbers and a set of actual numbers of backup jobs executed actually by the backup system in the second time period, a health status of the backup system.

According to a third aspect of the present disclosure, there is provided a computer program product being tangibly stored on a non-transient computer storage medium and comprising machine-executable instructions which, when executed by a device, cause the device to perform the steps of the method as described according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of example embodiments of the present disclosure will become more apparent, through the following detailed description with reference to the accompanying drawings, in which the same reference symbol generally refers to the same component.

DETAILED DESCRIPTION OF EMBODIMENTS

Figure 1:
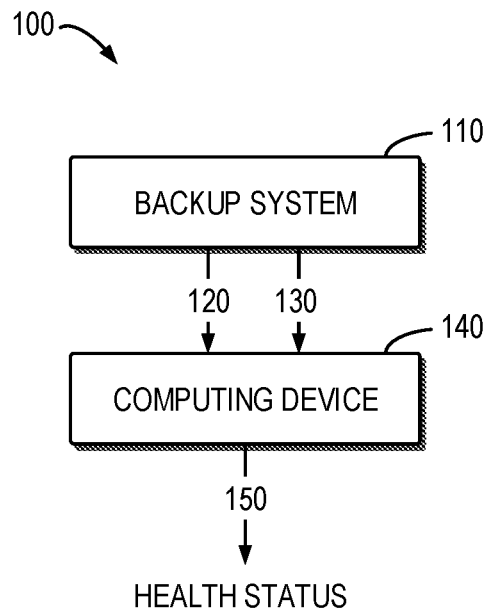
FIG. 1 illustrates a schematic diagram of an example environment in which embodiments of the present disclosure can be implemented therein.

Preferred embodiments of the present disclosure will be described in more detail below with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless otherwise indicated.

In a data backup system, a user typically customizes a data backup policy to enable the data backup system to perform data backup automatically. For example, the user may specify which data need to be backed up, when to perform backup, a backup cycle or a backup pattern (incremental backup or replacement backup). When performing data backup, the backup system only provides the user with feedback about whether the backup task has been finished successfully, causing the user unaware of whether the backup system is healthy currently. For example, due to aging of some devices, the backup time may be increased significantly, which may impact execution of the user's backup policy.

In general, after defining a backup policy, the user is not to revise the backup policy frequently, and the data to be backed up will not be changed significantly. Therefore, backups among different cycles typically follow certain rules. For example, in an example with a cycle being one week, the backup jobs in different weeks exhibit certain similarities in variation trend. Such similarities may be used to help determine a health status of the backup system.

According to embodiments of the present disclosure, there is provided a solution of managing a backup system. In the solution, historical backup information of the backup system in a first time period may be obtained, and at least one temporal feature corresponding to the first time period may be determined based on the historical backup information. The at least one temporal feature then may be used to determine a set of predicted numbers of backup jobs which are expected to be executed by the backup system in a second time period. Furthermore, the health status of the backup system may be determined by comparing the set of predicted numbers and a set of actual numbers of backup jobs executed actually within the second time period. In this way, the embodiments of the present disclosure can determine a health status of the backup system in time.

Reference will now be made to the accompanied drawings to describe the embodiments of the present disclosure. FIG. 1 illustrates a schematic diagram of an example environment 100 in which multiple embodiments of the present disclosure can be implemented therein. As shown in FIG. 1, a computing device 140 may be used to manage a backup system 110. The backup system 110 may be used to receive a backup policy defined by a user, and store data to be backed up into a backup storage device. In a process of performing data backup, the backup system 110 may generate and store a backup log for indicating historical backup jobs which have been executed.

The computing device 140 may receive historical backup information 120 from the backup system. The historical backup information 120 may indicate a set of numbers of backup jobs executed in a first time period. In some embodiments, the computing device 140 may obtain a backup log of the backup system 110 in the first time period. The backup log, for example, may record a start time and a finish time of each backup job. The computing device 140 may aggregate the backup log, to determine the set of numbers of the backup jobs which have been executed in the first time period. In the embodiments of the present disclosure, "number of backup jobs executed" may refer to a number of backup jobs received, a number of backup jobs finished, or a total number of backup jobs executed per time unit.

In some embodiments, the computing device 140 may aggregate, based on a backup cycle of the backup system 110, the backup log in the first time period into a time unit smaller than the backup cycle in granularity, to obtain a set of numbers. In a further example, if the backup cycle is one day, the computing device 140 may aggregate the backup log based on a number of backup jobs executed per hour. In another embodiment, if the backup cycle is one week, the computing device 140 may aggregate the backup log based on a number of backup jobs executed per day.

In some embodiments, due to abnormality of a log recording system, the determined historical backup information 130 may contain some abnormal data (for example, there are backup jobs in the previous and the following hour, except the mid-hour). The computing device 140, for example, may modify the abnormal data in a linear fit manner. For instance, the computing device 140 may set the average value of the numbers in the previous and the following hour as the value of the number of backups in the mid-hour.

Upon receiving the historical backup information 130, the computing device 140 may predict, based on the historical backup information 130, a set of predicted numbers of backup jobs to be executed by the backup system 110 in a second time period. In some embodiments, for the sake of prediction accuracy, the first time period is generally greater than the second time period. As shown in FIG. 1, the computing device 140 may receive from the backup system 110 a set of actual numbers 130 of backup jobs executed actually in the second time period, and determine a health status 150 of the backup system 110 by comparing the set of predicted numbers with the set of actual numbers 130.

Figure 2:
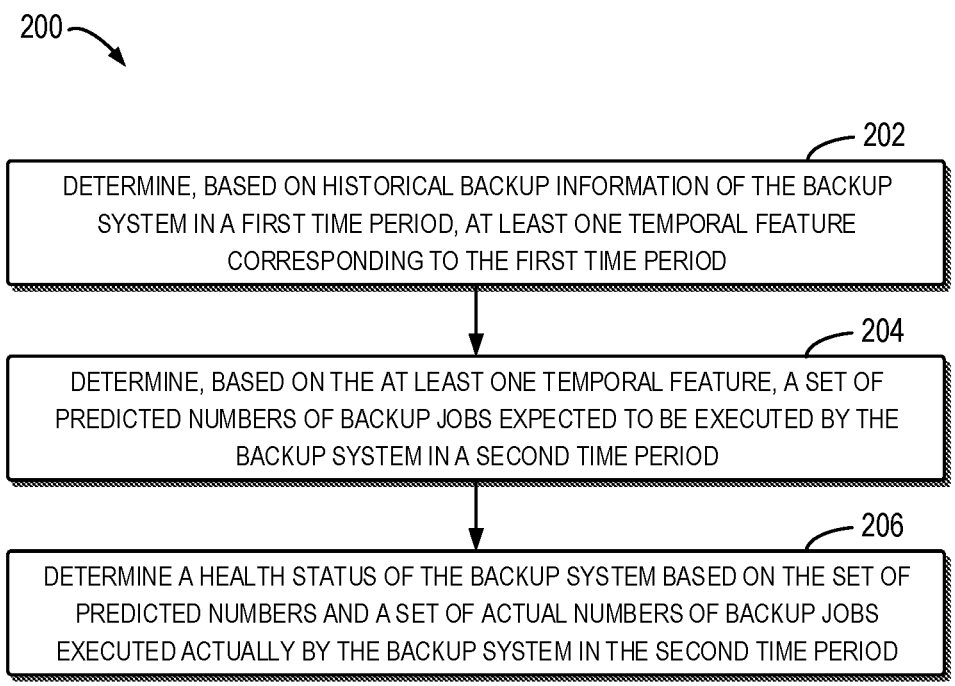
FIG. 2 illustrates a flowchart of an example method of managing a backup system according to embodiments of the present disclosure.

Hereinafter, reference will be made to FIGS. 2-5 to describe a process of managing a backup system according to embodiments of the present disclosure. FIG. 2 illustrates a flowchart of a method 200 of managing a backup system according to some embodiments of the present disclosure. The method 200, for example, may be implemented by the computing device 140 as shown in FIG. 1.

As shown in FIG. 2, at block 202, the computing device 140 determines, based on the historical backup information 120 of the backup system 110 in the first time period, at least one temporal feature corresponding to the first time period, where the historical backup information 120 indicates a set of numbers of backup jobs executed by the backup system 110 in the first time period.

Figure 3A:
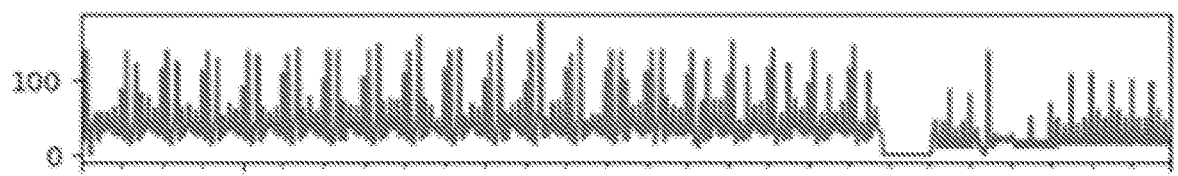
FIGS. 3A-3D illustrate schematic diagrams of extracting temporal features according to embodiments of the present disclosure.

As discussed above with reference to FIG. 1, the computing device 140, for example, may obtain the historical backup information 120 based on the backup log of the backup system 110. The historical backup information 120, for example, may be represented as a number of backup jobs executed in a plurality of units of time within the first time period. FIG. 3A illustrates temporal data 300A corresponding to example historical backup information according to embodiments of the present disclosure, where the X axis represents the time, and the Y axis denotes number of backup jobs. As shown in FIG. 3A, each point in the temporal data 300A indicates a number of backup jobs executed per hour. It can be seen that the numbers of backup jobs in the respective hours of different days show some similarities in variation trend.

Figure 3B:
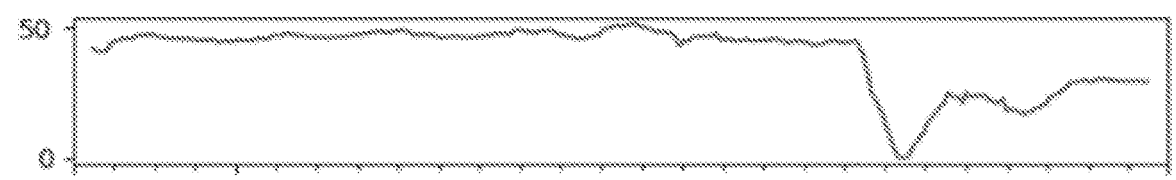
Figure 3C:
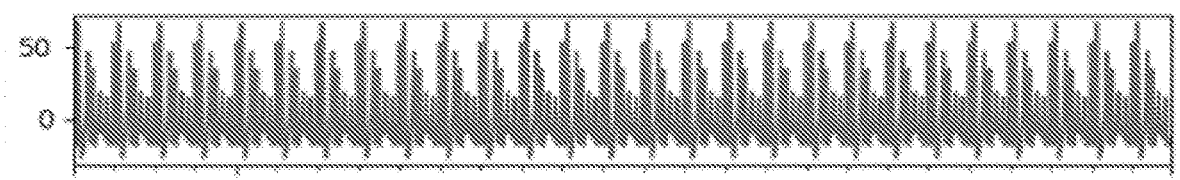
Figure 3D:
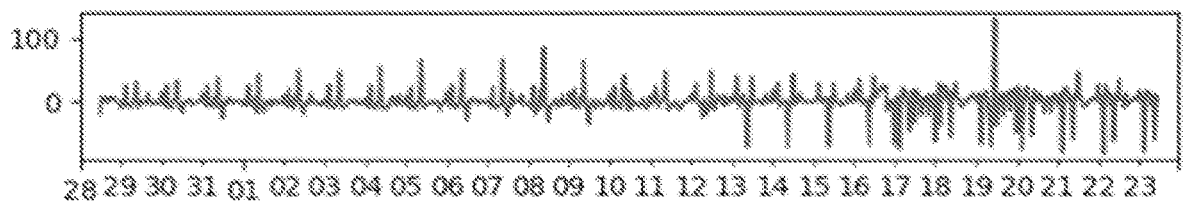

In some embodiments, the computing device 140 may decompose the temporal data corresponding to the historical backup information. More specifically, the computing device 140, for example, may decompose the temporal data into three types of features: a trend feature indicating a variation feature of the temporal data; a periodic feature indicating a cyclic feature of the temporal data; and a random feature indicating randomness other than the trend feature and the seasonal feature of the temporal data. FIGS. 3B-3D illustrate a trend feature 300B, a periodic feature 300C and a random feature 300D obtained by decomposing the temporal data as shown in FIG. 3A, respectively.

At block 204, the computing device 140 determines, based on at least one temporal feature, a set of predicted numbers of backup jobs expected to be executed by the backup system 110 in a second time period. In some embodiments, the computing device 140 may process at least one temporal feature with a temporal prediction model, to determine the set of predicted numbers. The temporal prediction model may be configured based on the previous backup information of the backup system 110.

In some embodiments, the computing device 140, for example, may use a SARIMA (Seasonal Autoregressive Integrated Moving Average) model to determine a set of predicted numbers. The SARIMA model is an ARIMA model taking seasonality into account, which may be represented as the formula (1) below:

$$(p,d,q) \times (P,D,Q)m \qquad (1)$$

p, d, q, P, D, Q and m are parameters of the model, where p, d, q, P, D and Q are parameters valued as 1 or 2, and m represents a seasonal parameter of the model. If the backup cycle is a day, m, for example, may be set to 24; if the backup cycle is a week, m, for example, may be set to 7; and if the backup cycle is a year, m, for example, may be set to 12.

In some embodiments, the computing device 140 may determine the parameters of the SARIMA model using the previous backup information of the backup system 110. More specifically, the computing device 140 may select an Akaike information criterion (AIC) which is represented by the formula (2) below as a target function:

$$AIC = -2 \log(L) + 2(p+q+k) \qquad (2)$$

where L is a likelihood of data, p is an order of an autoregressive part, and q is an order of a moving average part. The k represents an intercept of the ARIMA model. For AIC, if k=1, then there is an intercept in the ARIMA model (c≠0); and if k=0, then there is no intercept in the ARIMA model (c=0).

Further, the computing device 140 may traverse all possible values (0 or 1) of p, d, q, P, D and Q and make a selection based on the previous backup information, to choose parameters with a minimum total AIC as the final parameters of the SARIMA model. More specifically, the computing device 140 may extract, based on the historical backup information of the computing device 110, temporal features within a time period (for example, a last month), and then use the same to predict a number of backup jobs in the next day. After the training of the SARIMA model has been completed, the computing device 140 may input the temporal features associated with the first time period into the model, and then obtain a set of predicted numbers of backup jobs expected to be executed by the computing system 110 in the second time period.

At block 206, the computing device 140 determines a health status 150 of the backup system 110, based on the set of predicted numbers and a set of actual numbers 130 of backup jobs executed actually in the second time period.

In some embodiments, the second time period, for example, may include only a time unit. For example, in an example where the backup cycle is a day, the computing device 140 may predict a predicted number of backup jobs to be executed in the first hour of the second day, and acquire an actual number in the second day. The computing device 140, for example, may obtain a difference by comparing the predicted number and the actual number, to determine whether the backup system 110 is abnormal or not.

Figure 4:
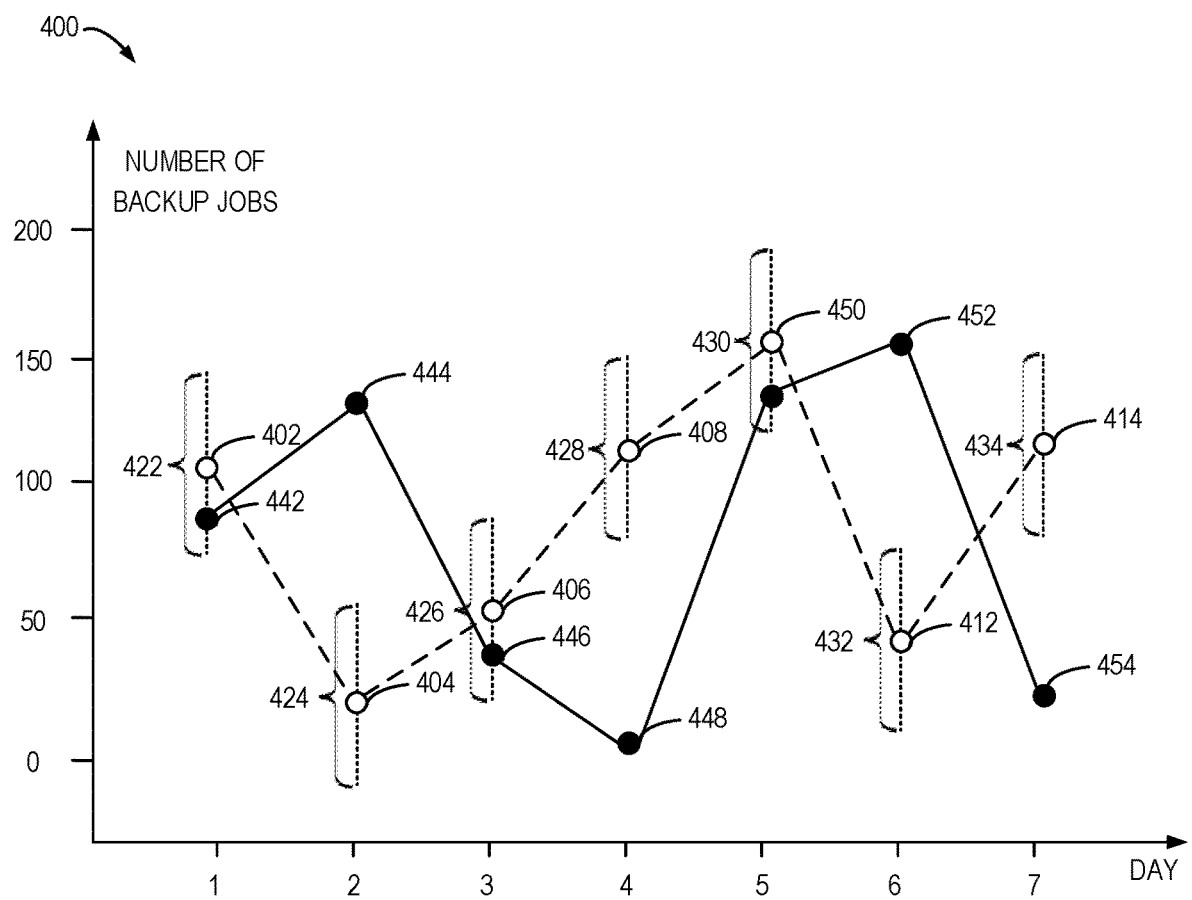
FIG. 4 illustrates a schematic diagram of an example method of determining a health status of a backup system according to embodiments of the present disclosure.

In some embodiments, in order to avoid impact resulting from uncertainty of the model, the second time period in the present disclosure may include a plurality of units of time (for example, a full backup cycle). FIG. 4 illustrates a schematic diagram of determining a health status 150 according to embodiments of the present disclosure. As shown in FIG. 4, the computing device 140, for example, may determine a set of predicted numbers in a future week as follows: a predicted number 402 corresponding to a first day, a predicted number 404 corresponding to a second day, a predicted number 406 corresponding to a third day, a predicted number 408 corresponding to a fourth day, a predicted number 410 corresponding to a fifth day, a predicted number 412 corresponding to a sixth day and a predicted number 414 corresponding to seventh day.

As shown in FIG. 4, at the end of the future week, the computing device 140, for example, may determine a set of actual numbers of backup jobs which have actually executed by the backup system 110 in the past week, including: an actual number 442 corresponding to the first day, an actual number 444 corresponding to the second day, an actual number 446 corresponding to the third day, an actual number 448 corresponding to the fourth day, an actual number 450 corresponding to the fifth day, an actual number 452 corresponding to the sixth day and an actual number 454 corresponding to the seventh day.

In some embodiments, the computing device 140 may compare the set of predicted numbers with the set of actual numbers to determine the health status 150 of the backup system 110. In some embodiments, the computing device 140, for example, may compare each actual number with the respective predicted number, to determine whether a difference there between is greater than a threshold. FIG. 4 is taken as an example, in which the computing device 140, for example, may determine the difference between the following predicted numbers and the corresponding actual numbers are greater than the threshold, including: the predicted number 404 and the actual number 444, the predicted number 408 and the actual number 448, the predicted number 412 and the actual number 452, and the predicted 414 and the actual number 454. That is, in the example of FIG. 4, the computing device 140 may determine that there are four time units, where the differences between the predicted numbers and the respective actual numbers are greater than the threshold.

In some embodiments, the computing device 140 may further compare a count or proportion of units of time in which the differences are greater than the threshold, to determine the health status 150 of the backup system 110. For example, in the example of FIG. 4, the computing device 140 may determine that the backup system 110 is abnormal, based on that a count (4) of time units, in which the differences are greater than the threshold, is greater than a threshold (2). Alternatively, the computing device 140 may also determine that the backup system 110 is abnormal, based on that a proportion (4/7) of the number of time units in which the differences are greater than the threshold exceeds a threshold (50%).

Figure 5:
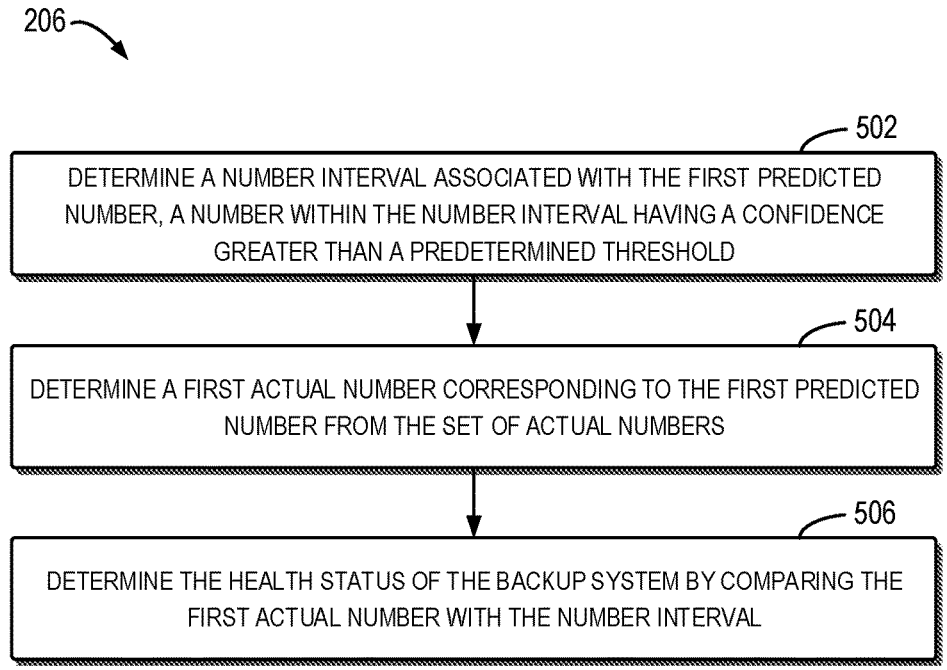
FIG. 5 illustrates a flowchart of an example method of determining a health status of a backup system according to embodiments of the present disclosure.

In some embodiments, the computing device 140 may further determine the health status 150 of the backup system 110 based on a confidence of model output. The specific process of block 206 will be described below with reference to FIG. 5. FIG. 5 illustrates a flow chart of an example method of determining a health status of a backup system according to embodiments of the present disclosure.

As shown in FIG. 5, at block 502, for a first predicted number in a set of predicted numbers, the computing device 140 may determine a number interval associated with the first predicted number, where a number within the number interval has a confidence greater than a predetermined threshold. FIG. 4 is taken as an example. In the circumstance that the predicted number 402 is used as an example of the first predicted number, the computing device 140 may determine a number interval 422 associated with the predicted number 402. It is taken into consideration that a predicted number of model output indicates a relation between a value of a predicted number and a respective confidence. For example, the predicted number 402 may have the highest confidence while a value that is greater or less than the value of the predicted number 402 may have a relatively lower confidence. Therefore, the computing device 140 may determine a respective number interval 422 in which a confidence of each number is greater than a predetermined threshold (for example, 0.7). It would be appreciated that specific numerical value of the threshold is provided only as an example, which may be set adaptively as required.

At block 504, the computing device 140 may determine a first actual number corresponding to the first predicted number from a set of actual numbers. Continuing with the example of FIG. 4, the computing device 140 may determine the first actual number corresponding to the first predicted number 402 as the actual number 422.

At block 506, the computing device 140 may determine the health status 150 of the backup system 110 by comparing the first actual number and the number interval. Continuing with the example of FIG. 4, the computing device 140 may determine the health status 150 of the backup system 110 by determining whether the actual number 442 falls within the number interval 422. In an embodiment where the second time period includes only one time unit, the computing device 140, for example, may determine the health status 150 of the backup system 110 based on a result of comparing the first actual number and the number interval.

Alternatively, in a circumstance where the second time period includes a plurality of units of time, the computing device 140 may determine a proportion of actual numbers in the set of actual numbers falling into respective number intervals. Continuing with the example of FIG. 4, the computing device 140 may determine that: the actual number 442 falls within the number interval 442, the actual number 444 falls out of the number interval 424, the actual number 446 falls within the number interval 426, the actual number 448 falls out of the number interval 428, the actual number 450 falls within the number interval 430, the actual number 452 falls out of the number interval 432, and the actual number 454 falls out of the number interval 434. That is, the computing device 140 may determine that a proportion of the actual numbers falling into the respective number intervals is 3/7.

In addition, the computing device 140 may compare the proportion with a predetermined proportion threshold, and determine that the backup system 110 is abnormal responsive to determining that the proportion is less than the predetermined proportion threshold. For example, the proportion threshold may be set to 50%, and in the case, the computing device 140 may determine that the backup system 110 is abnormal.

In another embodiment, in the circumstance where the second time period only includes a plurality of units of time, the computing device 140 may determine a count of actual numbers falling into respective number intervals in a set of actual numbers. Continuing with the example of FIG. 4, the computing device 140 may determine that the count of actual numbers falling into the respective number intervals in the set of actual numbers is 3.

In addition, the computing device 140 may compare the count with a predetermined count threshold, and determine that the backup system 110 is abnormal in accordance with a determination that the count is less than the predetermined threshold. For example, the count threshold may be set to 4, and in the case, the computing device 140 may determine that the backup system 110 is abnormal. It would be appreciated that the specific numerical values involved above are provided only as an example, without suggesting any limitation to the present disclosure.

In some embodiments, when the health status 150 indicates that the backup system 110 is abnormal, the computing device 140 may provide an alert of abnormality. The computing device 140 may provide an alert of abnormality in any appropriate manner (for example, text, audio, video, vibration or the like).

Based on the method as described above, the embodiments of the present application utilize seasonal features and compare predicted backup with actual backup to determine whether a backup system is abnormal. The embodiments of the present disclosure can detect possible abnormality of the backup system and thus improve stability of the backup system.

Figure 6:
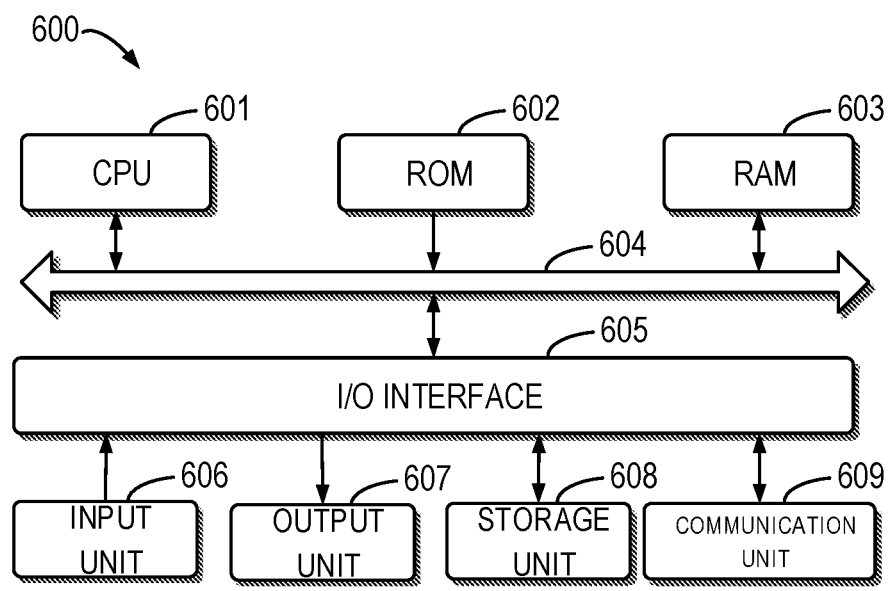
FIG. 6 illustrates a schematic block diagram of an example device for implementing embodiments of the present disclosure.

FIG. 6 illustrates a schematic block diagram of an example device 600 for implementing embodiments of the present disclosure. For example, the computing device 140 according to embodiments of the present disclosure may be implemented by the device 600. As shown, the device 600 includes a central processing unit (CPU) 601, which can execute various suitable actions and processing based on the computer program instructions stored in a read-only memory (ROM) 602 or computer program instructions loaded in the random-access memory (RAM) 603 from a storage unit 608. The RAM 603 may also store all kinds of programs and data required by the operations of the device 600. The CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as a keyboard, a mouse and the like; an output unit 607, e.g., various kinds of displays and loudspeakers etc.; a storage unit 608, such as a drive and an optical drive etc.; and a communication unit 609, such as a network card, a modem, a wireless transceiver and the like. The communication unit 609 allows the device 600 to exchange information/data with other devices via the computer network, such as Internet, and/or various telecommunication networks.

The above described process and processing, such as method 200, can be executed by the processing unit 601. For example, in some embodiments, the method 200 may be implemented as a computer software program tangibly included in the machine-readable medium, e.g., storage unit 608. In some embodiments, the computer program may be partially or fully loaded and/or mounted to the device 600 via the ROM 602 and/or communication unit 609. When the computer program is loaded to the RAM 603 and executed by the CPU 601, one or more steps of the above described method 200 can be implemented.

The present disclosure can be a method, a device, a system and/or a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing devices. The computer-readable storage medium may be, but is not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer drive, a hard drive, a random-access memory (RAM), a read-only memory (ROM), an erasable programmable read-only memory (EPROM or flash), a static random-access memory (SRAM), a portable compact disk read-only memory (CD-ROM), a digital versatile drive (DVD), a memory stick, a floppy drive, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions herein may be downloaded from the computer-readable storage medium to each computing/processing device, or to an external computer or external storage via Internet, a local area network, a wide area network and/or a wireless network. The network may include copper-transmitted cables, optical fiber transmission, wireless transmission, routers, firewall, switches, network gate computers and/or edge servers. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combination of one or more programming languages, where the programming languages include object-oriented programming languages, such as Smalltalk, C++ and the like, and conventional procedural programming languages, e.g., "C" language or similar programming languages. The computer-readable program instructions may be implemented fully on a user's computer, partially on the user's computer, as an independent software package, partially on the user's computer and partially on a remote computer, or completely on the remote computer or a server. In the case where a remote computer is involved, the remote computer may be connected to the user's computer via any type of networks, including a local area network (LAN) and a wide area network (WAN), or to an external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Flowcharts and/or block diagrams of a method, a device (system) and a computer program product according to embodiments of the present disclosure describe various aspects of the present disclosure. It should be appreciated that each block of the flowcharts and/or block diagrams and the combination thereof can be implemented by computer-readable program instructions.

The computer-readable program instructions may be provided to the processing unit of a general-purpose computer, a dedicated computer or other programmable data processing devices to manufacture a machine, such that the instructions which, when executed by the processing unit of the computer or other programmable data processing devices, generate a device for implementing functions/acts stipulated in one or more blocks in the flow chart and/or block diagram. The computer-readable program instructions may also be stored in the computer-readable storage medium and cause the computer, programmable data processing device and/or other devices to work in a particular manner, such that the computer-readable medium stored with instructions includes an article of manufacture, including instructions for implementing various aspects of the functions/acts stipulated in one or more blocks of the flow chart and/or block diagram.

The computer-readable program instructions may also be loaded into the computer, other programmable data processing devices or other devices, so as to execute a series of operation steps on the computer, other programmable data processing apparatuses or other devices to generate a computer-implemented process. Therefore, the instructions executed on the computer, other programmable data processing devices or other devices implement functions/acts stipulated in one or more blocks of the flow chart and/or block diagram.

The flow chart and block diagram in the drawings illustrate system architecture, functions and operations that may be implemented by the device, method and computer program product according to the plurality of implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order depending on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is for the purpose of illustration rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method of managing a backup system, comprising:
   extracting, based on historical backup information in a first time period, at least one temporal feature corresponding to the first time period, wherein extracting the at least one temporal feature comprises decomposing temporal data corresponding to the historical backup information, wherein the historical backup information was generated by:
  recording the historical backup information of the backup system and a backup log including all backup jobs, and
  aggregating the backup log to determine a set of numbers of the backup jobs that have been executed in the first time period;
determining, based on the at least one temporal feature input into a temporal prediction model, a set of predicted numbers of backup jobs expected to be executed by the backup system in a future second time period, wherein the temporal prediction model was trained based on the historical backup information; and
determining a health status of the backup system based on the set of predicted numbers and a set of actual numbers of backup jobs executed by the backup system in the second time period.

2. The method of claim 1, wherein
decomposing temporal data corresponding to the historical backup information comprises obtaining at least one of the following as the at least one temporal feature:
  a trend feature indicating a variation feature of the temporal data,
  a periodic feature indicating a cyclic feature of the temporal data, or
  a random feature indicating randomness other than the trend feature and the cyclic feature of the temporal data.

3. The method of claim 1, wherein determining the set of predicted numbers comprises:
  determining the set of predicted numbers by processing the at least one temporal feature with the temporal prediction model, the temporal prediction model being built based on prior backup information of the backup system.

4. The method of claim 1, wherein determining the health status of the backup system comprises:
  for a first predicted number in the set of predicted numbers:
    determining a number interval associated with the first predicted number, a number within the number interval having a confidence greater than a predetermined threshold;
    determining a first actual number corresponding to the first predicted number from the set of actual numbers; and
    determining the health status of the backup system by comparing the first actual number with the number interval.

5. The method of claim 4, wherein determining the health status of the backup system by comparing the first actual number with the number interval comprises:
  determining a proportion of actual numbers falling into a corresponding number interval in the set of actual numbers; and
  in accordance with a determination that the proportion is less than a predetermined proportion threshold, determining that the backup system is abnormal.

6. The method of claim 4, wherein determining the health status of the backup system by comparing the first actual number with the number interval comprises:
  determining a count of actual numbers falling into a corresponding number interval in the set of actual numbers; and
  in accordance with a determination that the count is less than a predetermined count threshold, determining that the backup system is abnormal.

7. The method of claim 1, further comprising:
in accordance with a determination that the health status indicates abnormality of the backup system, providing an alert of the abnormality.

8. An electronic device, comprising:
at least one processing unit; and
at least one memory coupled to the at least one processing unit and storing instructions executable by the at least one processing unit, the instructions, when executed by the at least one processing unit, causing the device to perform acts comprising:
  extracting, based on historical backup information in a first time period, at least one temporal feature corresponding to the first time period, wherein extracting the at least one temporal feature comprises decomposing temporal data corresponding to the historical backup information, wherein the historical backup information was generated by:
    recording the historical backup information of a backup system and a backup log including all backup jobs, and
    aggregating the backup log to determine a set of numbers of the backup jobs that have been executed in the first time period;
  determining, based on the at least one temporal feature input into a temporal prediction model, a set of predicted numbers of backup jobs expected to be executed by the backup system in a future second time period, wherein the temporal prediction model was trained based on the historical backup information; and
  determining a health status of the backup system based on the set of predicted numbers and a set of actual numbers of backup jobs executed by the backup system in the second time period.

9. The device of claim 8, wherein
decomposing temporal data corresponding to the historical backup information comprises obtaining at least one of the following as the at least one temporal feature:
  a trend feature indicating a variation feature of the temporal data,
  a periodic feature indicating a cyclic feature of the temporal data, or
  a random feature indicating randomness other than the trend feature and the cyclic feature of the temporal data.

10. The device of claim 8, wherein determining the set of predicted numbers comprises:
  determining the set of predicted numbers by processing the at least one temporal feature using a temporal prediction model, the temporal prediction model being built based on previous backup information of the backup system.

11. The device of claim 8, wherein determining the health status of the backup system comprises:
  for a first predicted number in the set of predicted numbers:
    determining a number interval associated with the first predicted number, numbers within the number interval having a confidence greater than a predetermined threshold;
    determining a first actual number corresponding to the first predicted number from the set of actual numbers; and determining the health status of the backup system by comparing the first actual number with the number interval.

12. The device of claim 11, wherein determining the health status of the backup system by comparing the first actual number with the number interval comprises:
   determining a proportion of actual numbers falling into a corresponding number interval in the set of actual numbers; and
   in accordance with a determination that the proportion is less than a predetermined proportion threshold, determining that the backup system is abnormal.

13. The device of claim 11, wherein determining the health status of the backup system by comparing the first actual number with the number interval comprises:
   determining a count of actual numbers falling into a corresponding number interval in the set of actual numbers; and
   in accordance with a determination that the count is less than a predetermined count threshold, determining that the backup system is abnormal.

14. The device of claim 8, the acts further comprising:
   in accordance with a determination that the health status indicates abnormality of the backup system, providing an alert of the abnormality.

15. A computer program product being tangibly stored on a non-transient computer storage medium and comprising machine-executable instructions which, when executed by a device, cause the device to perform acts, the acts comprising:
   extracting, based on historical backup information in a first time period, at least one temporal feature corresponding to the first time period, wherein extracting the at least one temporal feature comprises decomposing temporal data corresponding to the historical backup information, wherein the historical backup information was generated by:
   recording the historical backup information of a backup system and a backup log including all backup jobs, and
   aggregating the backup log to determine a set of numbers of the backup jobs that have been executed in the first time period;
   determining, based on the at least one temporal feature input into a temporal prediction model, a set of predicted numbers of backup jobs expected to be executed by the backup system in a future second time period, wherein the temporal prediction model was trained based on the historical backup information; and
   determining a health status of the backup system based on the set of predicted numbers and a set of actual numbers of backup jobs executed by the backup system in the second time period.

16. The computer program product of claim 15, wherein decomposing temporal data corresponding to the historical backup information comprises obtaining at least one of the following as the at least one temporal feature:
   a trend feature indicating a variation feature of the temporal data,
   a periodic feature indicating a cyclic feature of the temporal data, or
   a random feature indicating randomness other than the trend feature and the cyclic feature of the temporal data.

17. The computer program product of claim 15, wherein determining the set of predicted numbers comprises:
   determining the set of predicted numbers by processing the at least one temporal feature with a temporal prediction model, the temporal prediction model being built based on prior backup information of the backup system.

* * * * *